United States Patent
Lu (10) Patent No.: US 10,621,516 B2
(45) Date of Patent: Apr. 14, 2020

(54) CONTENT DELIVERY METHOD, APPARATUS, AND STORAGE MEDIUM

(71) Applicant: TENCENT TECHNOLOGY (SHENZHEN) COMPANY LIMITED, Shenzhen (CN)

(72) Inventor: Zheng Lu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 127 days.

(21) Appl. No.: 15/842,275

(22) Filed: Dec. 14, 2017

(65) Prior Publication Data

US 2018/0107953 A1    Apr. 19, 2018

Related U.S. Application Data (63) Continuation of application No. PCT/CN2016/082502, filed on May 18, 2016.

(30) Foreign Application Priority Data

Sep. 17, 2015 (CN) .......................... 2015 1 0593480

(51) Int. Cl.
  G06Q 10/04    (2012.01)
  G06F 16/9535  (2019.01)
  (Continued)

(52) U.S. Cl.
  CPC ....... G06Q 10/047 (2013.01); G06F 16/9535 (2019.01); G06F 17/18 (2013.01);
  (Continued)

(58) Field of Classification Search
  CPC .................................................. G06Q 10/047
  (Continued)

(56) References Cited

U.S. PATENT DOCUMENTS 5,696,965 A * 12/1997 Dedrick ................ G06Q 30/02
                                                      709/203
6,006,218 A * 12/1999 Breese .................. G06F 16/951
(Continued)

FOREIGN PATENT DOCUMENTS

CN    101520878 A    9/2009
CN    102110265 A    6/2011
(Continued)

OTHER PUBLICATIONS

Techopedia, "von Neumann Architecture", 2019 (Year: 2019).*
(Continued)

*Primary Examiner* — Ondrej C Vostal
(74) *Attorney, Agent, or Firm* — Anova Law Group, PLLC (57) ABSTRACT

Content delivery method, apparatus, and storage medium are provided. A content delivery method includes: traversing user accounts and generating an initial content propagation appraisal value of a traversed first user; iteratively performing: traversing the user accounts and searching for friend accounts of a traversed second user account, and calculating a weighted sum of content propagation appraisal values of the friend accounts of the second user account and updating content propagation appraisal values of the second user account according to a sum of the weighted sum and a first forwarding probability of the second user account; and exiting iteration when the content propagation appraisal values of the second user account converge, and selecting, according to the content propagation appraisal values, user accounts to push content data.

17 Claims, 7 Drawing Sheets

(51) Int. Cl.
*G06Q 30/00* (2012.01)
*G06Q 30/02* (2012.01)
*G06F 17/18* (2006.01)
*H04L 12/26* (2006.01)
*G06Q 50/00* (2012.01)

(52) U.S. Cl.
CPC ......... *G06Q 30/00* (2013.01); *G06Q 30/0269* (2013.01); *G06Q 30/0278* (2013.01); *H04L 43/06* (2013.01); *G06Q 50/01* (2013.01)

(58) Field of Classification Search
USPC ....................................................... 709/206
See application file for complete search history.

(56) References Cited

U.S. PATENT DOCUMENTS

| | | | | |
|---|---|---|---|---|
| 6,557,054 | B2* | 4/2003 | Reisman | G06F 8/65 710/33 |
| 8,301,132 | B1* | 10/2012 | Reeves | H04W 4/60 455/418 |
| 8,335,831 | B2* | 12/2012 | Fan | H04L 12/1859 709/206 |
| 8,626,911 | B2* | 1/2014 | Konig | H04L 67/20 709/224 |
| 9,922,344 | B1* | 3/2018 | Christophe | G06Q 30/0256 |
| 2004/0122735 | A1* | 6/2004 | Meshkin | G06Q 30/02 705/14.27 |
| 2006/0053047 | A1* | 3/2006 | Garcia | G06Q 30/02 705/14.64 |
| 2006/0094455 | A1* | 5/2006 | Hannu | H04W 28/18 455/518 |
| 2008/0134043 | A1* | 6/2008 | Georgis | H04N 7/10 715/733 |
| 2008/0162260 | A1* | 7/2008 | Rohan | G06Q 30/02 705/14.4 |
| 2008/0281711 | A1* | 11/2008 | Bridges | G06Q 30/02 705/14.27 |
| 2010/0088130 | A1* | 4/2010 | Bonchi | G06Q 10/06395 705/7.41 |
| 2010/0100415 | A1 | 4/2010 | Plummer et al. | |
| 2010/0306249 | A1* | 12/2010 | Hill | G06Q 30/02 707/769 |
| 2011/0015987 | A1* | 1/2011 | Chakraborty | G06Q 30/02 705/14.39 |
| 2011/0314017 | A1* | 12/2011 | Yariv | G06Q 30/02 707/737 |
| 2012/0036080 | A1* | 2/2012 | Singer | G06Q 10/10 705/319 |
| 2012/0047025 | A1* | 2/2012 | Strohman | G06Q 30/0275 705/14.71 |
| 2012/0066720 | A1* | 3/2012 | Park | H04N 21/6125 725/51 |
| 2012/0089617 | A1* | 4/2012 | Frey | G06F 16/9535 707/748 |
| 2012/0245980 | A1* | 9/2012 | Cook | G06Q 10/04 705/7.37 |
| 2012/0278476 | A1* | 11/2012 | Agrawal | G06Q 50/01 709/224 |
| 2013/0138662 | A1* | 5/2013 | He | G06Q 30/0269 707/748 |
| 2013/0144974 | A1* | 6/2013 | Haakenson | H04L 67/26 709/217 |
| 2013/0253940 | A1* | 9/2013 | Zziwa | G06Q 50/22 705/2 |
| 2013/0254213 | A1* | 9/2013 | Cheng | G06Q 50/01 707/748 |
| 2013/0254295 | A1* | 9/2013 | Lee | H04L 51/32 709/204 |
| 2013/0275320 | A1* | 10/2013 | Moore | G06Q 10/1053 705/321 |
| 2013/0318180 | A1* | 11/2013 | Amin | G06Q 30/0251 709/206 |
| 2014/0066044 | A1* | 3/2014 | Ramnani | H04W 8/24 455/418 |
| 2014/0156681 | A1* | 6/2014 | Lee | G06F 16/9535 707/754 |
| 2014/0188593 | A1* | 7/2014 | Sun | G06Q 30/0256 705/14.41 |
| 2014/0330769 | A1* | 11/2014 | Nguyen | G06Q 10/10 707/609 |
| 2014/0372203 | A1* | 12/2014 | Powell | G06Q 30/0243 705/14.42 |
| 2015/0019588 | A1* | 1/2015 | Yang | G06Q 30/0201 707/776 |
| 2015/0100356 | A1* | 4/2015 | Bessler | G06Q 30/01 705/7.12 |
| 2016/0063094 | A1* | 3/2016 | Udupa | G06F 17/277 707/748 |

FOREIGN PATENT DOCUMENTS

| | | |
|---|---|---|
| CN | 103294800 A | 9/2013 |
| CN | 104902294 A | 9/2015 |
| CN | 105262794 A | 1/2016 |
| WO | 2009154430 A2 | 12/2009 |

OTHER PUBLICATIONS

The World Intellectual Property Organization (WIPO) International Search Report for PCT/CN2016/082502 dated Jul. 20, 2016 7 Pages (including translation).
The European Patent Office (EPO) The Extended European Search Report for 16845529.3 dated May 16, 2018 7 Pages.

\* cited by examiner

CONTENT DELIVERY METHOD, APPARATUS, AND STORAGE MEDIUM

RELATED APPLICATION

This application is a continuation application of PCT Patent Application No. PCT/CN2016/082502, filed on May 18, 2016, which claims priority to Chinese Patent Application No. 201510593480.1, entitled "CONTENT DELIVERY METHOD AND APPARATUS" filed on Sep. 17, 2015, all of which is incorporated herein by reference in their entirety.

FIELD OF THE TECHNOLOGY

The present disclosure generally relates to the field of Internet technologies, and in particular, relates to a content delivery method, a content delivery apparatus, and a storage medium.

BACKGROUND OF THE DISCLOSURE

Content delivery is used for promoting specific advertisement content, news content, notification content, and multimedia resource content, such as audio and a video, to a specific group of people. For example, an existing social network-based application usually releases advertisement content by using an official account or a social network application account that is relatively highly concerned, and another user account that follows the social network application account may receive the advertisement, so that delivery of the advertisement content is implemented.

To improve delivery accuracy, a conventional content delivery system usually first pre-estimates a degree of interest in the to-be-delivered content of a user, and then pushes the content to a user account whose estimated degree of interest is relatively high. For example, a content delivery method that is frequently used is selecting user accounts to perform delivery according to a click rate and a conversion rate (which is a probability of a user purchasing a corresponding product after clicking an advertisement in an advertisement delivery system) of delivered content.

However, the conventional content delivery system has at least the following problems. To make more users receive the content and to broaden a scope for the content delivery, a large quantity of user accounts needs to be screened and selected to perform delivery and push the delivered content to the user accounts. Consequently, content delivery accuracy is low.

SUMMARY

One aspect of the present disclosure provides a content delivery method, applied to an apparatus including at least a memory and a processor. The method includes traversing user accounts and generating an initial content propagation appraisal value of a traversed first user; iteratively performing: traversing the user accounts and searching for friend accounts of a traversed second user account, and calculating a weighted sum of content propagation appraisal values of the friend accounts of the second user account and updating content propagation appraisal values of the second user account according to a sum of the weighted sum and a first forwarding probability of the second user account; and exiting iteration when the content propagation appraisal values of the second user account converge, and selecting, according to the content propagation appraisal values, user accounts to push content data.

Another aspect of the present disclosure provides a content delivery apparatus. The apparatus includes a memory, storing program instructions for a content delivery method, and a processor, coupled to the memory. When executing the program instructions, the processor is configured to: traverse user accounts and generate an initial content propagation appraisal value of a traversed first user account; iteratively perform: traversing the user accounts and searching for friend accounts of a traversed second user account; and calculating a weighted sum of content propagation appraisal values of the friend accounts of the second user account and updating content propagation appraisal values of the second user account according to a sum of the weighted sum and a first forwarding probability of the second user account; and exit iteration when the content propagation appraisal values of the second user account converge and select, according to the content propagation appraisal values, user accounts to push content data.

Another aspect of the present disclosure provides a non-transitory computer-readable storage medium containing computer-executable program instructions for, when executed by a processor, performing a content delivery method. The method includes traversing user accounts and generating an initial content propagation appraisal value of a traversed first user; iteratively performing: traversing the user accounts and searching for friend accounts of a traversed second user account, and calculating a weighted sum of content propagation appraisal values of the friend accounts of the second user account and updating content propagation appraisal values of the second user account according to a sum of the weighted sum and a first forwarding probability of the second user account; and exiting iteration when the content propagation appraisal values of the second user account converge, and selecting, according to the content propagation appraisal values, user accounts to push content data.

BRIEF DESCRIPTION OF THE DRAWINGS

To describe the technical solutions in the embodiments of the present disclosure or the existing technology more clearly, the following briefly introduces the accompanying drawings required for describing the embodiments or the existing technology. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some of the embodiments of the present disclosure rather than all of the embodiments. All other embodiments obtained by a person of ordinary skill in the art based on the embodiments of the present disclosure without creative efforts shall fall within the protection scope of the present disclosure.

Various embodiments of the present disclosure provide content delivery method, apparatus and storage medium. The present disclosure provides technical solutions to the technical problems about a conventional content delivery having a low content delivery accuracy because content needs to be pushed to a large quantity of user accounts when selecting who to push the content.

The method is based on a social network application including a large quality of user accounts between which a social relationship chain (that is, a mapping between any two user accounts that is established by using a friend relationship between two of a limited quantity of user accounts, for example, when users A and B are friends, B and C are friends, and C and D are friends, an A-B-C-D social relationship chain exists between A and D) exists.

As such, association and forwarding operations between user accounts in a social network application are utilized to push the content data only to a small quantity of user accounts. The content data is then transferred to other user accounts on social relationship chains on the small quantity of user accounts by sequentially forwarding the content data. The content data is thus spread by the small quantity of user accounts to a broader range of user accounts. Meanwhile, an association degree between users also ensures a probability for a user to click and/or view the content data that is forwarded by a user that this user follows, so as to reduce an initial quantity of user accounts for pushing the content data and lower delivery costs while ensuring delivery accuracy and a delivery scope of the content data.

Further, implementation of the disclosed method may depend on a computer program. The computer program may be an application, in which a social relationship chain exists, such as a social network application, an instant messaging application, or a webgame application. The computer program may run on a computer system based on a von Neumann architecture. The computer system may be a server device of the foregoing application, in which a social relationship chain, such as a social network application, an instant messaging application, or a webgame application, exists.

Figure 1:
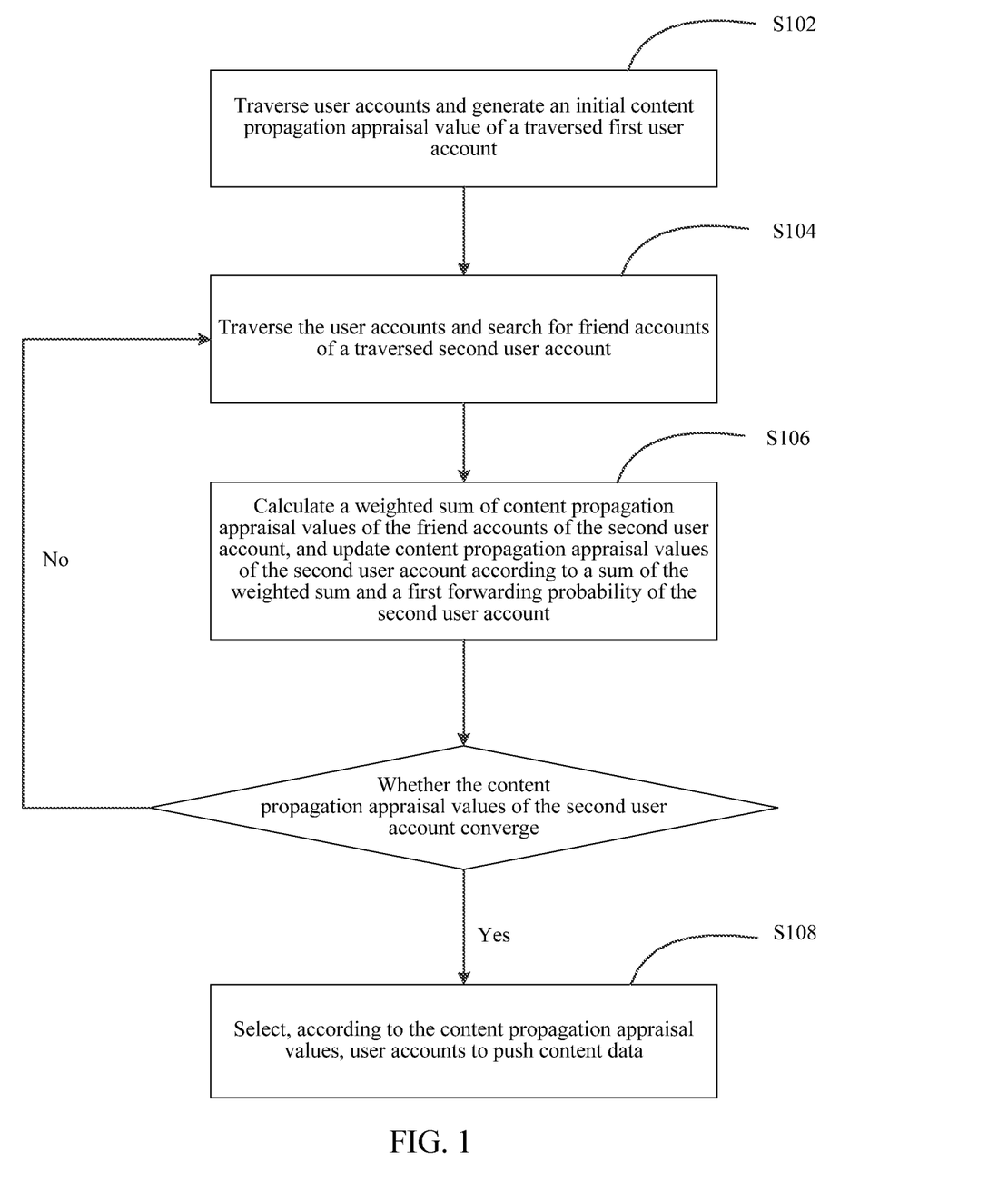
FIG. 1 is a flowchart of an exemplary content delivery method according to some embodiments of the present disclosure.

For example, as shown in FIG. 1, an exemplary content delivery method includes:

In S102: Traversing user accounts and generating an initial content propagation appraisal value of a traversed first user account.

Content data is data that needs to be delivered to a user account. Upon classification in terms of service, the content data may be advertisement content data, news content data, multimedia content data, and the like. For example, in an application scenario of an advertisement delivery system based on a social network application, the content data that needs to be delivered to a user account is an advertisement. In a news releasing system based on a social network application, the content data that needs to be delivered to a user account is news information.

The content data may usually include a link and digest description information of complete content corresponding to the link. In different implementations, the link, corresponding to an actual service, may be used to jump to a purchase page, a page for reading complete news content, or a play page of a multimedia file. For example, in an application scenario of an advertisement delivery system based on a social network application, the content data to be delivered may include an advertisement picture, text information of an advertisement, and a link corresponding to an electric business purchase page. When the content data is pushed to a user account, a user that logs in by using the user account may receive the advertisement content data on a terminal, and may jump to a corresponding electric business purchase page by clicking a link in the advertisement.

A metric value "content propagation appraisal value" is used in the present disclosure to evaluate a capability of propagating content data by a user account. A greater content propagation appraisal value of a user account indicates that when the user account receives content data, the content data may be propagated to more users. A less content propagation appraisal value of a user account indicates that when the user account receives content data, the content data may be propagated to fewer users.

In this exemplary embodiment, a first forwarding probability of each user account in the social network application may be calculated in advance, and the first forwarding probability is used as an initial content propagation appraisal value of each user account.

The first forwarding probability of forwarding, by a user account, received content data may be calculated in the following manner: obtaining a quantity N1 of releasing times for releasing content data, obtaining a quantity N2 of forwarding times for forwarding, by a user account A, the released content data, and obtaining the first forwarding probability of forwarding, by the user account A, the content data by calculating N2/N1.

For example, a page of a news-type application periodically releases news, and the page is provided with a share button based on the social network application. A quantity N1 of releasing times for releasing news on the page and a quantity N2 of forwarding times for forwarding the news by using a user account A may be accounted, and then a first forwarding probability of forwarding, by the user account A, the news released on the page is obtained by calculating N2/N1.

Further, input content data may also be obtained in advance. A keyword or a tag matching the received content data is extracted. A quantity N1 of releasing times for releasing the content data that also matches the keyword or tag is obtained. A quantity N2 of forwarding times for forwarding, by a user account A, the content data that also matches the keyword or tag is obtained. Then, a first forwarding probability of forwarding, by the user account A, the news released on the page is obtained by calculating N2/N1. For specific content data, a specific first forwarding probability is calculated as an initial content propagation appraisal value of each user account, so that content propagation capabilities of each user account corresponding to received different content data may be determined, so as to propagate the content data more widely.

It should be noted that the terms, such as first and second, used in the present disclosure for defining user identifiers are used for distinguishing multiple traversing processes in a process for performing the method. A first user account is a traversed user account in a social network application when an initial content propagation appraisal value is calculated. A second user account is a traversed user account in the social network application in a stage of iteratively updating content propagation appraisal values of user accounts in the social network application. A third user account and a fourth user account are respectively traversed user accounts in the social network application in a stage of subsequently correcting the content propagation appraisal values of the user accounts in the social network application. However, user accounts indicated by the first, second, ... user accounts are still user accounts in the social network application and are not further described below in detail.

In this exemplary embodiment, after a first forwarding probability of each user account of a social network application for received content data, that is, an initial content propagation appraisal value of each user account, is obtained by calculation, an iteration process may be entered. In the iteration process, all user accounts are traversed in an iteration. To distinguish the iteration from the foregoing traversing process, a traversed user account in the iteration process is marked as a second user account. The iteration process is a process of updating content propagation appraisal values of the traversed second user account according to content propagation appraisal values of other user accounts until content propagation appraisal values of all user accounts converge without being changed along with evolution of the iteration process (or a variation is less than a threshold).

For example, the following exemplary steps may be iteratively performed:

In S104: Traversing the user accounts and searching for friend accounts of a traversed second user account.

In S106: Calculating a weighted sum of content propagation appraisal values of the friend accounts of the second user account, and update content propagation appraisal values of the second user account according to a sum of the weighted sum and a first forwarding probability of the second user account.

Figure 2:
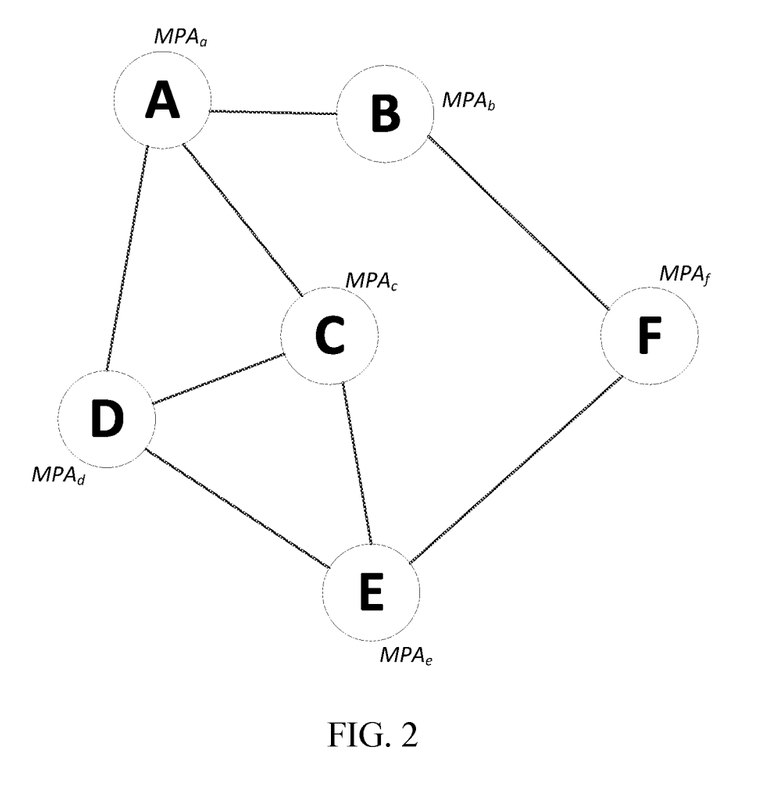
FIG. 2 is a schematic diagram of an exemplary social relationship chain of a user account according to some embodiments of the present disclosure.

FIG. 2 shows an exemplary social relationship chain between user accounts of a social network application on which the present method depends. It is assumed that user accounts in a social network application are A, B, C, D, E, and F. A is in a friend relationship with B, C, and D, B is in a friend relationship with A and F, C is in a friend relationship with A, D, and E, D is in a friend relationship with A, C, and E, E is in a friend relationship with C, D, and F, and F is in a friend relationship with B and E.

In an iteration process, user accounts may be traversed according to a sequence of A, B, C, D, E, and F. Traversing is started from an account user A, and when A is traversed, the following exemplary steps may be performed:

searching for friend accounts of A, that is, B, C, and D, and separately obtaining content propagation appraisal values $MPA_b$, $MPA_c$, and $MPA_d$ of B, C, and D;

calculating a weighted sum of the content propagation appraisal values of B, C, and D, that is, $$\alpha_b \times MPA_b + \alpha_c \times MPA_c + \alpha_d \times MPA_d,$$

where $\alpha_b$, $\alpha_c$, and $\alpha_d$ are weight coefficients of the content propagation appraisal values $MPA_b$, $MPA_c$, and $MPA_d$ of B, C, and D when the weighted sum is calculated; and then obtaining a first forwarding probability $\beta_a$ of A, and calculating a sum of the first forwarding probability of A and the foregoing weighted sum to obtain an updated content propagation appraisal value of A:

$$MPA_a = \beta_a + \alpha_b \times MPA_b + \alpha_c \times MPA_c + \alpha_d \times MPA_d.$$

That is, when the iteration process is a first iteration. When A is traversed, the content propagation appraisal value of A is updated from the initial first forwarding probability $\beta_a$ into:

$$MPA_a = \beta_a + \alpha_b \times MPA_b + \alpha_c \times MPA_c + \alpha_d \times MPA_d.$$

After the updated content propagation appraisal value of A is traversed in this iteration process, traversing is continued to B, and the following exemplary steps may be performed:

searching for friend accounts of B, that is, A and F, and separately obtaining content propagation appraisal values $MPA_a$ and $MPA_f$ of A and F;

calculating a weighted sum of the content propagation appraisal values of A and F, that is, $$\alpha_a \times MPA_a + \alpha_f \times MPA_f,$$

and then obtaining, a first forwarding probability $\beta_b$ of B, and calculating a sum of the first forwarding probability of B and the foregoing weighted sum to obtain an updated content propagation appraisal value of B:

$$MPA_b = \beta_b + \alpha_a \times MPA_a + \alpha_f \times MPA_f.$$

That is, when the iteration process is a first iteration. When B is traversed, the content propagation appraisal value of B is updated from an initial first forwarding probability $B_a$ into:

$$MPA_b = \beta_b + \alpha_a \times MPA_a + \alpha_f \times MPA_f.$$

In addition, in this case, the content propagation appraisal value $MPA_a$ of A is updated from initial $\beta_a$ into the foregoing:

$$MPA_a = \beta_a + \alpha_b \times MPA_b + \alpha_c \times MPA_c + \alpha_d \times MPA_d.$$

Based on the above, in an iteration process, A, B, C, D, E, and F may be traversed in sequence according to the foregoing manner, and content propagation appraisal values thereof are calculated. Then, the content propagation appraisal values of A, B, C, D, E, and F are gradually corrected as a quantity of iterations increases until the content propagation appraisal values converge and do not change.

That is, for a traversed $i^{th}$ user account in each iteration process, when a $t^{th}$ iteration is performed, a content propagation appraisal value $MPA_{ti}$ thereof may be obtained by calculation according to a formula:

$$MPA_{ti} = \beta_i + \sum_{j=1}^{Ni} \alpha_j \times MPA_{tj},$$

where

Ni is a total quantity of friend accounts of the traversed $i^{th}$ user account in each iteration process. $MPA_{tj}$ is a content propagation appraisal value of a $j^{th}$ friend account in Ni of the traversed $i^{th}$ user account when $MPA_{ti}$ calculated. $\alpha_j$ is a weight coefficient of the content propagation appraisal value of a $j^{th}$ friend account in Ni of the traversed $i^{th}$ user account.

Figure 3:
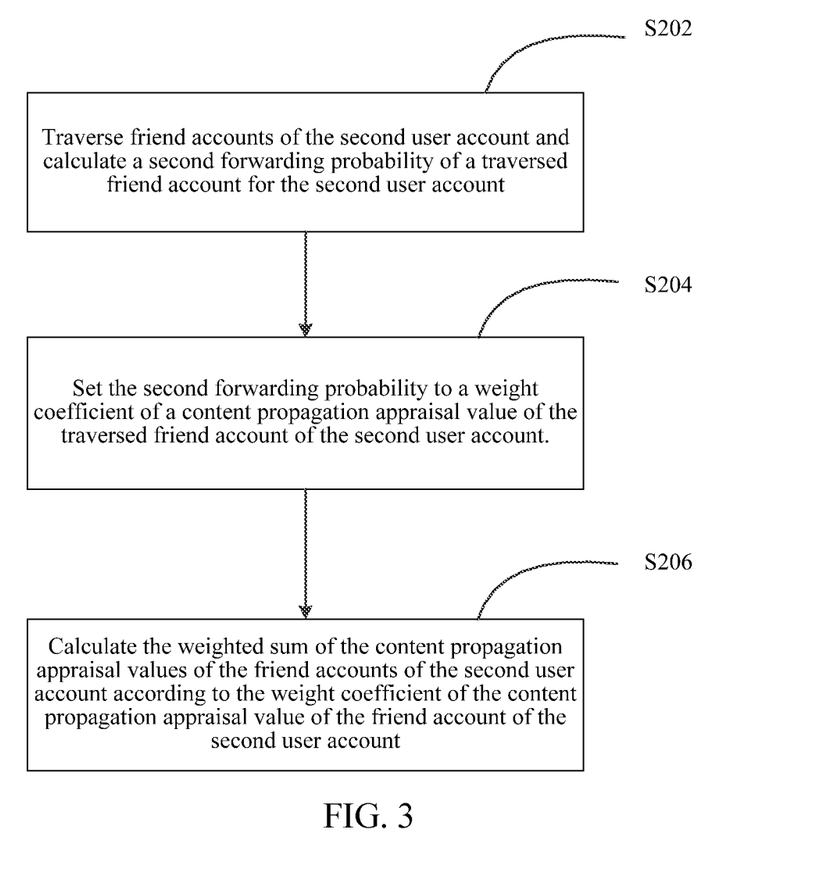
FIG. 3 is a flowchart of an exemplary process of calculating a weight coefficient according to some embodiments of the present disclosure.

In this exemplary embodiment, a weight coefficient of a content propagation appraisal value of each friend account may be set according to a content forwarding capability of each friend account of the traversed second user account for the second user account. For example, as shown in FIG. 3, the following exemplary steps may be performed:

In S202: Traversing friend accounts of the second user account and calculating a second forwarding probability of a traversed friend account for the second user account.

In S204: Setting the second forwarding probability to a weight coefficient of a content propagation appraisal value of the traversed friend account of the second user account.

In S206: Calculating the weighted sum of the content propagation appraisal values of the friend accounts of the second user account according to the weight coefficient of the content propagation appraisal value of the friend account of the second user account.

A second forwarding probability of a friend account of the second user account for the second user account is a ratio of performing, by the friend account, a forwarding operation on content released by the second user account. For example, the following exemplary steps may be performed:

obtaining a quantity of releasing times for releasing content by the second user account; obtaining a quantity of forwarding times for forwarding, by the traversed friend account, the content released by the second user account; and dividing the quantity of forwarding times for forwarding by the quantity of releasing times for releasing to calculate the second forwarding probability of the traversed friend account for the second user account.

As in the foregoing example, when the user account A is traversed, it is found that friend accounts of A are B, C, and D. When a quantity of releasing times for releasing content (for example, release operations such as releasing microblogs, releasing moments, and releasing blogs) by A is 100, the friend B forwards the content for 20 times, the friend C forwards the content for 30 times, and friend D forwards the content for 40 times, a second forwarding probability of the friend B for the user A is 0.2, a second forwarding probability of the friend C for the user A is 0.3, and a second forwarding probability of the friend D for the user A is 0.4. Therefore, the content propagation appraisal value of A may be obtained by calculation according to a formula:

$$MPA_a = \beta_a + 0.2 \times MPA_b + 0.3 \times MPA_c + 0.4 \times MPA_d.$$

In this exemplary embodiment, to determine whether to end an iteration process, when all user accounts are iteratively traversed each time, as in the foregoing example, after A, B, C, D, E, and F are traversed in each iteration process, whether content propagation appraisal values of each user account converge may be determined. When the content propagation appraisal values of each user account converge, the exemplary step S108 is performed by: selecting, according to the content propagation appraisal values, user accounts to push content data. When the content propagation appraisal values of the second user account do not converge, iteration is returned to, and exemplary step S104 is performed by: Traversing the user accounts again.

For example, in this exemplary embodiment, variations may be obtained when the content propagation appraisal values of the second user account are updated, and it is determined that the content propagation appraisal values of the second user account converge when all of the variations are less than a threshold.

For example, when the exemplary steps S104 and S106 are iteratively performed for k times, when a variation of $MPA_{ka}$ relative to $MPA_{k-1a}$ is less than a threshold, a variation of $MPA_{kb}$ relative to $MPA_{k-1b}$ is less than the threshold, . . . , and a variation of $MPA_{kf}$ relative to $MPA_{k-1f}$ is less than the threshold, it can be determined that the content propagation appraisal values of the second user account converge, so that the iteration is ended, and the exemplary step S108 is performed.

In another embodiment, a quantity of traversing times for traversing the second user account whose forwarding probability has been obtained by calculation may be obtained, and it is determined that the content propagation appraisal values of the second user account converge when the quantity of traversing times for traversing is greater than or equal to a threshold.

For example, a maximum quantity of iterations may be preset to 1000. When the exemplary steps S104 and S106 are iteratively performed for 1000 times, the iteration is ended, obtained content propagation appraisal values of A, B, C, D, E, and F are $MPA_{1000a}$, $MPA_{1000b}$ . . . , $MPA_{1000f}$, and the exemplary step S108 is performed.

As stated above, after the iteration is performed for k times, when content propagation appraisal values of all user accounts converge, an obtained content propagation appraisal value of each user account is $MPA_{ki}$, the user accounts may be sorted according to $MPA_{ki}$, and a user account with a relatively large $MPA_{ki}$ is selected according to the sorting as a target to push the content data.

For example, when $MPA_{ka}$) $MPA_{kb}$) $MPA_{kc}$) $MPA_{kd}$) $MPA_{ke}$) $MPA_{kf}$, user accounts are selected according to a sequence of A, B, C, D, E, and F as targets to push the content data.

Further, a preset quantity of users for delivery may be obtained; the user accounts are sorted according to the content propagation appraisal values and the user accounts that correspond to a number of users for delivery and are top-ranked among the sorted user accounts are selected to push the content data.

For example, in the foregoing example, when the preset quantity of users for delivery is 2, A and B may be selected as targets to push the content data. As shown in FIG. 2, the content data is probably forwarded by A and B, so as to be received by C, D, and E, so that when the content data is pushed to relatively few user accounts, the content data can still be pushed to more user accounts.

Further, before the step of selecting, according to the content propagation appraisal values, user accounts to push content data, a content propagation appraisal value, obtained after the alteration, of each user account may be corrected. There are many correction manners, which are described below by using two embodiments.

Figure 4:
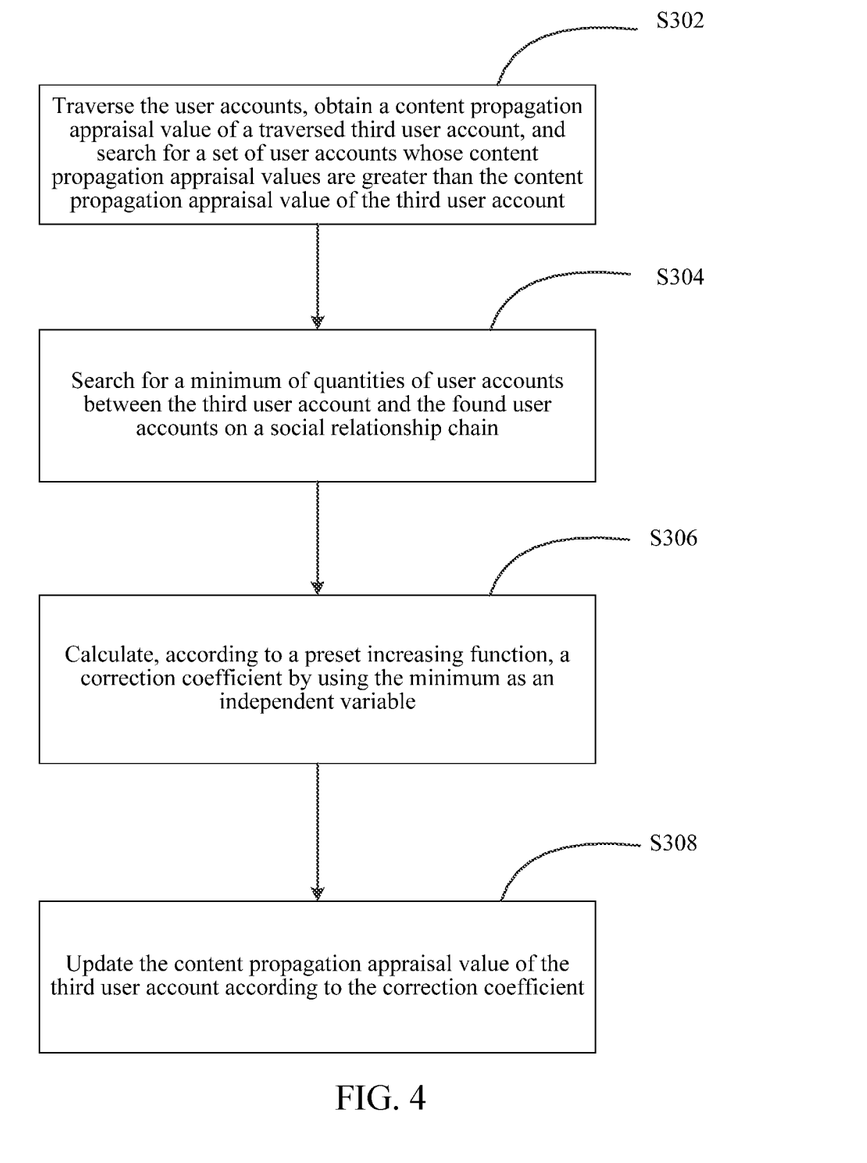
FIG. 4 is a flowchart of an exemplary process of correcting a content propagation appraisal value according to some embodiments of the present disclosure.

In various embodiments, as shown in FIG. 4, after the converged content propagation appraisal value of each user account is obtained by the iteration, the following exemplary steps may be performed.

In S302: Traversing the user accounts, obtain a content propagation appraisal value of a traversed third user account, and search for a set of user accounts whose content propagation appraisal values are greater than the content propagation appraisal value of the third user account.

The third user account is a user account that is traversed when the user accounts are traversed in a correction process of this exemplary embodiment. As in the) foregoing example, when $MPA_{ka}$) $MPA_{kd}$) $MPA_{kf}$) $MPA_{kb}$)

$MPA_{ke}$) $MPA_{kc}$ is obtained, in this traversal, when F is traversed, found user accounts whose content propagation appraisal values are greater than a content propagation appraisal value of F are A and D.

In S304: Searching for a minimum of quantities of user accounts between the third user account and the found user accounts on a social relationship chain.

As in the foregoing example, F and A are not in a friend relationship, but F and B are in a friend relationship, and B and A are in a friend relationship. Therefore, on a social relationship chain from F to A, a quantity of user accounts therebetween is 2 (that is, B and A). F and D are not in a friend relationship, but F and E are in a friend relationship, and E and D are in a friend relationship. Therefore, on a social relationship chain from F to D, a quantity of user accounts therebetween is 2 (that is, E and D). Therefore, a minimum of a quantity of user accounts between F and A on a social relationship chain and a quantity of user accounts between F and D on a social relationship chain is 2.

In S306: Calculating, according to a preset increasing function, a correction coefficient by using the minimum as an independent variable.

In S308: Updating the content propagation appraisal value of the third user account according to the correction coefficient.

That is, a content propagation appraisal value of each user account may be updated according to a formula:

$MPA=f(n)\times MPA$, f(n) being an increasing function, where n is the minimum corresponding to the user account. Preferably, f(n) may be preset to:

$$f(n) = \frac{1}{1+e^{-n}}.$$

As in the foregoing example, when a content propagation appraisal value greater than $MPA_{kd}$ is $MPA_{ka}$, and a minimum of quantities of user accounts between A and D on a social relationship chain is 1, a corrected content propagation appraisal value $MPA_{kd}$ of D is:

$$MPA_{kd} = \frac{1}{1+e^{-1}} MPA_{kd}.$$

When content propagation appraisal values greater than $MPA_{kf}$ are $MPA_{ka}$ and $MPA_{kd}$, and a minimum of quantities of user accounts between F and A and between F and D on the social relationship chain is 2. Therefore, a corrected content propagation appraisal value $MPA_{kf}$ of F is:

$$MPA_{kf} = \frac{1}{1+e^{-2}} MPA_{kf}.$$

Therefore, a correction coefficient of $MPA_{kf}$, relative to $MPA_{kd}$, is relatively high.

That is, although $MPA_{kd}$, relative to $MPA_{kf}$ is relatively high, because D and A are relatively close on the social relationship chain, a probability that after being forwarded by A and B, content data is propagated to the same user accounts in sequence is relatively large, so that delivery points are excessively concentrated, and a content data propagation scope is reduced. However, because F and A are distant from each other on the social relationship chain, delivery points are dispersed, and the content data may be spread to a boarder propagation scope by forwarding. After a correction coefficient of the minimum of the quantities of user accounts there-between on the social relationship chain is added, a relationship between a content propagation capability and a dispersion degree of the delivery points may be balanced, so that the content data may be propagated to a broader scope.

Figure 5:
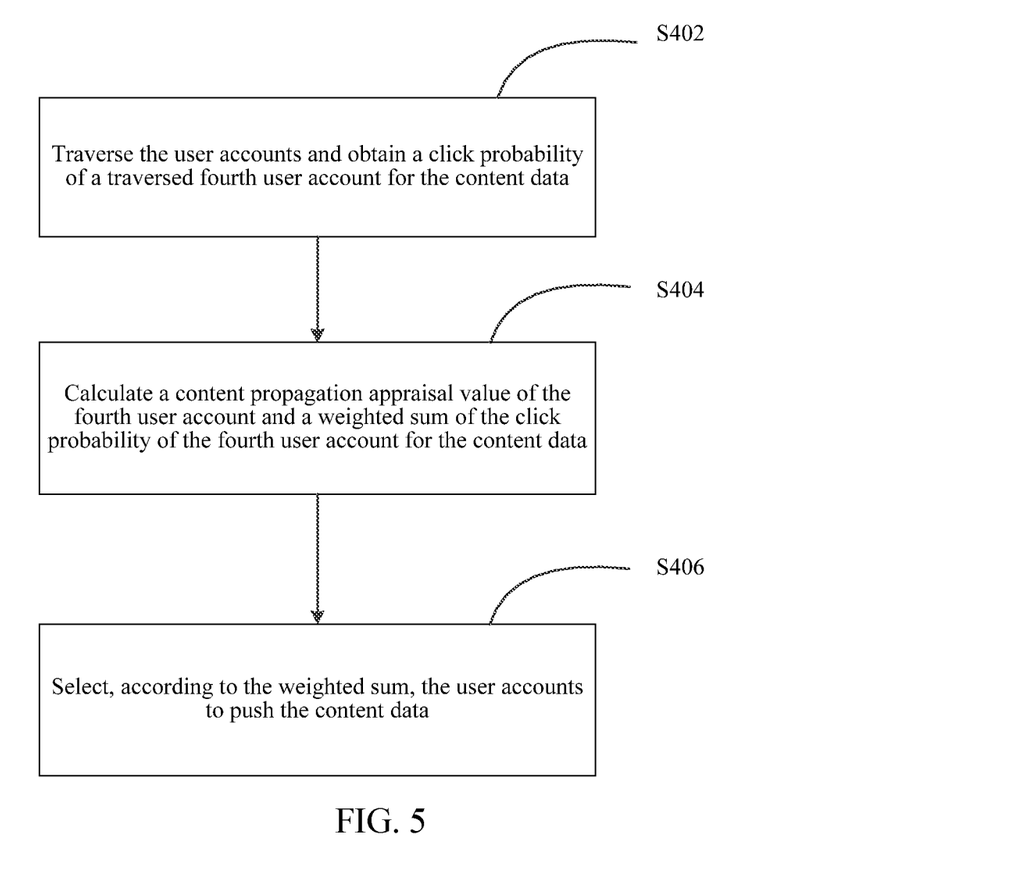
FIG. 5 is a flowchart of selecting user accounts with reference to a click rate for content delivery according to some embodiments of the present disclosure.

In various embodiments, as shown in FIG. 5, after the converged content propagation appraisal value of each user account is obtained by the iteration, the following exemplary steps may be performed.

In S402: Traversing the user accounts and obtaining a click probability of a traversed fourth user account for the content data.

In S404: Calculating a content propagation appraisal value of the fourth user account and a weighted sum of the click probability of the fourth user account for the content data.

In S406: Selecting, according to the weighted sum, the user accounts to push the content data.

The fourth user account is a user account that is traversed when the user accounts are traversed in a correction process of this exemplary embodiment. In this exemplary embodiment, when a user account is selected as a target to push the content data, not only a content propagation capability of the user account is considered, but also a probability of clicking and/or converting the content data by the user account are considered.

For example, in the foregoing example, although $MPA_{kf}$, relative to $MPA_{kd}$, is smaller, when a probability of clicking, by F, the content data to view, browse, or convert the content data is relatively high, F is still selected as a target to push the content data. As a result, when the user account is selected as a target to push the content data, not only a content propagation capability of the user account is considered, but also a degree of adaptation between the content data and the user account is considered. Accuracy of content data delivery is therefore improved.

Figure 6:
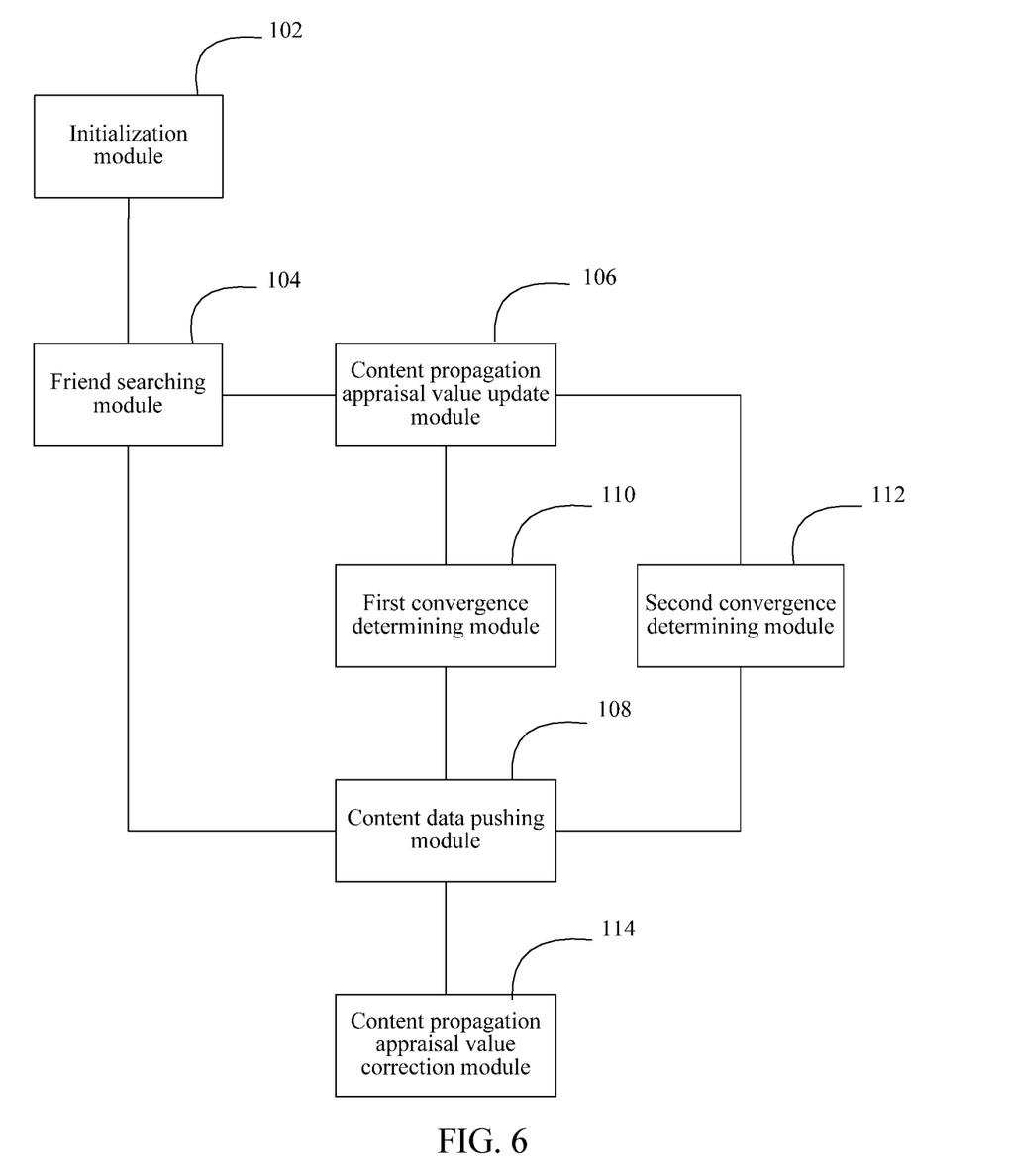
FIG. 6 is a schematic diagram of an exemplary content delivery apparatus according to some embodiments of the present disclosure.

To solve the technical problems of a conventional content delivery having low content delivery accuracy because content needs to be pushed to a large quantity of user accounts when selecting who to push the content. In an exemplary embodiment, as shown in FIG. 6, an exemplary content delivery apparatus is provided, including an initialization module 102, a friend searching module 104, a content propagation appraisal value update module 106, and a content data pushing module 108.

The initialization module 102 is configured to traverse user accounts and generate an initial content propagation appraisal value of a traversed first user account.

The friend searching module 104 is configured to traverse the user accounts and search for friend accounts of a traversed second user account.

The content propagation appraisal value update module 106 is configured to calculate a weighted sum of content propagation appraisal values of the friend accounts of the second user account and update content propagation appraisal values of the second user account according to a sum of the weighted sum and a first forwarding probability of the second user account.

The content data pushing module 108 is configured to: exit iteration when the content propagation appraisal values of the second user account converge and select, according to the content propagation appraisal values, user accounts to push content data; and call the friend searching module 104 and the content propagation appraisal value update module 106 to perform iteration when the content propagation appraisal values of the second user account do not converge.

In this exemplary embodiment, the initialization module 102 is further configured to calculate a first forwarding probability of the traversed first user account and set the first forwarding probability to the initial content propagation appraisal value of the traversed first user account.

In this exemplary embodiment, the content propagation appraisal value update module 106 is further configured to: traverse the friend accounts of the second user account and calculate a second forwarding probability of a traversed friend account for the second user account; set the second forwarding probability to a weight coefficient of a content propagation appraisal value of the traversed friend account of the second user account; and calculate the weighted sum of the content propagation appraisal values of the friend accounts of the second user account according to the weight coefficient of the content propagation appraisal value of the friend account of the second user account.

In this exemplary embodiment, the content propagation appraisal value update module 106 is further configured to: obtain a quantity of releasing times for releasing content by the second user account; obtain a quantity of forwarding times for forwarding, by the traversed friend account, the content released by the second user account; and divide the quantity of forwarding times for forwarding by the quantity of releasing times for releasing to calculate the second forwarding probability of the traversed friend account for the second user account.

In an exemplary embodiment, as shown in FIG. 6, the apparatus further includes a first convergence determining module 110, configured to: obtain variations when the content propagation appraisal values of the second user account are updated, and determine that the content propagation appraisal values of the second user account converge when all of the variations are less than a threshold.

In another embodiment, as shown in FIG. 6, the apparatus further includes a second convergence determining module 112, configured to: obtain a quantity of traversing times for traversing the second user account whose forwarding probability has been obtained by calculation, and determining that the content propagation appraisal values of the second user account converge when the quantity of traversing times for traversing is greater than or equal to a threshold.

In this exemplary embodiment, as shown in FIG. 6, the apparatus further includes a content propagation appraisal value correction module 114, configured to: traverse the user accounts, obtain a content propagation appraisal value of a traversed third user account, and search for a set of user accounts whose content propagation appraisal values are greater than the content propagation appraisal value of the third user account; search for a minimum of quantities of user accounts between the third user account and the found user accounts on a social relationship chain; calculate, according to a preset increasing function, a correction coefficient by using the minimum as an independent variable; and update the content propagation appraisal value of the third user account according to the correction coefficient.

In this exemplary embodiment, the content data pushing module 108 is further configured to: traverse the user accounts and obtain a click probability of a traversed fourth user account for the content data; calculate a content propagation appraisal value of the fourth user account and a weighted sum of the click probability of the fourth user account for the content data; and select, according to the weighted sum, the user accounts to push the content data.

In this exemplary embodiment, the content data pushing module 108 is further configured to: obtain a preset quantity of users for delivery; and sort the user accounts according to the content propagation appraisal values and select the user accounts corresponding to a number of users for delivery and top-ranked among the sorted user accounts, to push the content data.

According to an embodiment of the present disclosure, the content delivery method shown in FIG. 1 and FIG. 3 to FIG. 5 may be performed by units in the content delivery apparatus shown in FIG. 6. For example, steps S102, S104, S106, and S108 shown in FIG. 1 may be respectively performed by the initialization module 102, the friend searching module 104, the content propagation appraisal value update module 106, and the content data pushing module 108 that are shown in FIG. 6. Steps S202, S204, and S206 shown in FIG. 3 may be performed by the content propagation appraisal value update module 106 shown in FIG. 6. Steps S302, S304, S306, and S308 shown in FIG. 4 may be performed by the content propagation appraisal value correction module 114 shown in FIG. 6. Steps S402, S404, and S406 shown in FIG. 5 may be performed by the content data pushing module 108 shown in FIG. 6.

According to another embodiment of the present disclosure, units in the content delivery apparatus shown in FIG. 6 may be constituted by one or several another units separately or in complete combination, or a (some) unit(s) may be divided into multiple functionally smaller units. In this way, operations may also be implemented without affecting implementation of technical effects of the embodiments of the present disclosure. The foregoing units are divided based on logical functions. In actual application, functions of one unit may also be implemented by multiple units, or functions of multiple units are implemented by one unit. In other embodiments of the present disclosure, a terminal device may also include other modules. However, in actual application, these functions may also be implemented with the assistance of other units and may be implemented by multiple units in cooperation.

According to another embodiment of the present disclosure, the content delivery apparatus shown in FIG. 6 may be constructed and the content delivery method according to the embodiments of the present disclosure may be implemented by running a computer program (including program code) capable of executing the content delivery method shown in FIG. 1 and FIG. 3 to FIG. 5 on a general-purpose computing device including a processing element and a storage element such as a central processing unit (CPU), a random access memory (RAM), and a read-only memory (ROM). The computer program can be recorded on, for example, a computer readable recording medium, is loaded on the foregoing computing device by using the computer readable recording medium, and runs therein.

Figure 7:
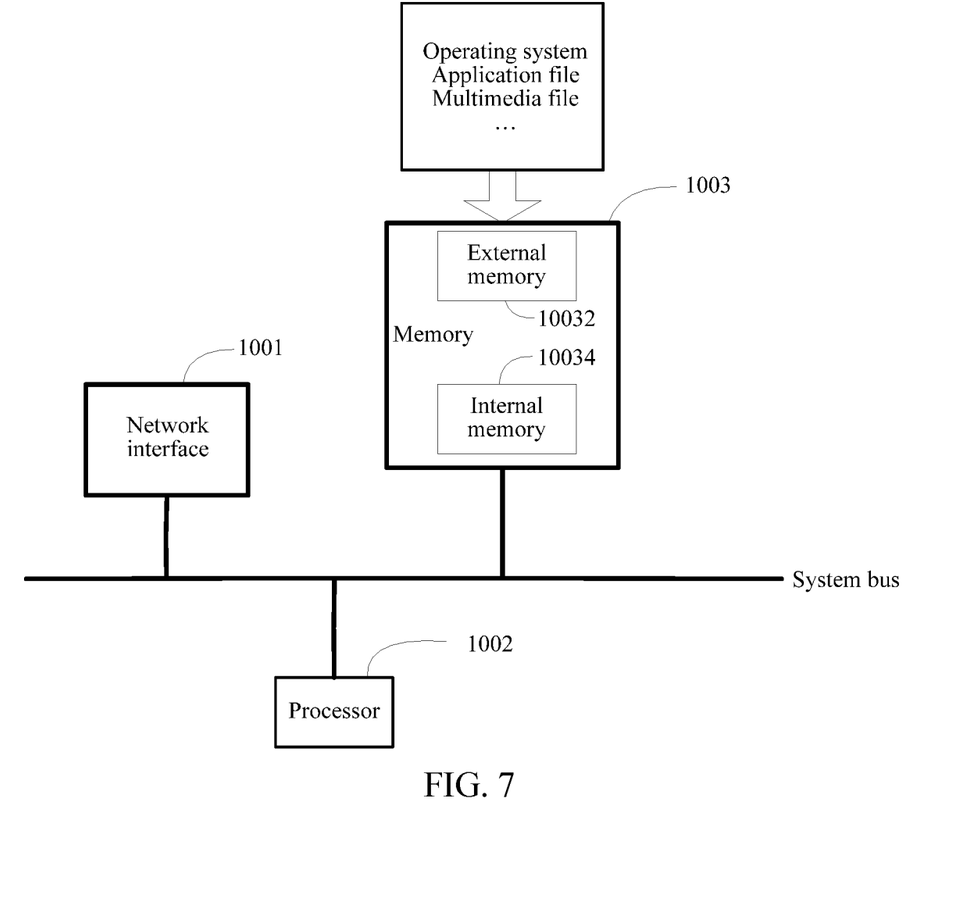
FIG. 7 is a schematic structural diagram of an exemplary computer device running a content delivery method according to some embodiments of the present disclosure.

By the disclosed foregoing content delivery method and apparatus, association and forwarding operations between user accounts in a social network application are utilized to push the content data only to a small quantity of user accounts. The content data is then transferred to other user accounts on social relationship chains on the small quantity of user accounts by sequentially forwarding the content data. The content data is thus spread by the small quantity of user accounts to a broader range of user accounts. Meanwhile, an association degree between users also ensures a probability for a user to click and/or view the content data that is forwarded by a user that this user follows, so as to improve delivery accuracy and a delivery scope of the content data In an exemplary embodiment, as shown in FIG. 7, FIG. 7 shows a server device of a computer system 10 based on a von Neumann architecture running the foregoing first or second content delivery method. The computer system may be a server or a server cluster that directly performs the content delivery method, or a server cluster device that provides a virtual machine as a server program running environment to perform the content delivery method. For example, the server device may include a network interface 1001, a processor 1002, and a memory 1003 that are connected by using a system bus. The memory 1003 may include an external memory 10032 (such as a hard disk, an optical disc, or a floppy disk) and an internal memory 10034.

In this exemplary embodiment, running of this method is based on a computer program. A program file of the computer program is stored in the external memory 10032 of the computer system 10 based on a von Neumann architecture, is loaded to the internal memory 10034 while running, and then, after being compiled as machine code, is delivered to the processor 1002 for execution, so that an initialization module 102, friend searching module 104, content propagation appraisal value update module 106, and content data pushing module 108 are logically formed in the computer system 10 based on a von Neumann architecture. In addition, in a process of performing the content delivery method, input parameters are all received by using the network interface 1001, are transferred to the memory 1003 for caching, and then are input into the processor 1002 for processing. Resultant data of the processing is either cached in the memory 1003 for subsequent processing or transferred to the network interface 1001 for output.

A set of program code is stored in the memory 1003, and the processor 1002 calls the program code stored in the memory 1003 to perform the following operations:

traversing user accounts and generating an initial content propagation appraisal value of a traversed first user;

traversing the user accounts and searching for friend accounts of a traversed second user account;

calculating a weighted sum of content propagation appraisal values of the friend accounts of the second user account, and updating content propagation appraisal values of the second user account according to a sum of the weighted sum and a first forwarding probability of the second user account; and exiting iteration when the content propagation appraisal values of the second user account converge, and selecting, according to the content propagation appraisal values, user accounts to push content data.

In another embodiment, that the processor 1002 calls the program code stored in the memory 1003 to perform the operation of generating an initial content propagation appraisal value of a traversed first user includes:

calculating a first forwarding probability of the traversed first user account and setting the first forwarding probability to the initial content propagation appraisal value of the traversed first user account.

In another embodiment, that the processor 1002 calls the program code stored in the memory 1003 to perform the operation of calculating a weighted sum of content propagation appraisal values of the friend accounts of the second user account may further include:

traversing the friend accounts of the second user account and calculating a second forwarding probability of a traversed friend account for the second user account;

setting the second forwarding probability to a weight coefficient of a content propagation appraisal value of the traversed friend account of the second user account; and calculating the weighted sum of the content propagation appraisal values of the friend accounts of the second user account according to the weight coefficient of the content propagation appraisal value of the friend account of the second user account.

In another embodiment, that the processor 1002 calls the program code stored in the memory 1003 to perform the operation of calculating a second forwarding probability of the traversed friend account for the second user account may further include:

obtaining a quantity of releasing times for releasing content by the second user account;

obtaining a quantity of forwarding times for forwarding, by the traversed friend account, the content released by the second user account; and dividing the quantity of forwarding times for forwarding by the quantity of releasing times for releasing to calculate the second forwarding probability of the traversed friend account for the second user account.

In an optional embodiment, the processor 1002 calls the program code stored in the memory 1003 to further perform the following operation:

obtaining variations when the content propagation appraisal values of the second user account are updated, and determining that the content propagation appraisal values of the second user account converge when all of the variations are less than a threshold.

In an optional embodiment, the processor 1002 calls the program code stored in the memory 1003 to further perform the following operation:

obtaining a quantity of traversing times for traversing the second user account whose forwarding probability has been obtained by calculation, and determining that the content propagation appraisal values of the second user account converge when the quantity of traversing times for traversing is greater than or equal to a threshold.

In another embodiment, before the processor 1002 calls the program code stored in the memory 1003 to perform the operation of selecting, according to the content propagation appraisal values, user accounts to push content data, the operations may further include:

traversing the user accounts, obtaining a content propagation appraisal value of a traversed third user account, and searching for a set of user accounts whose content propagation appraisal values are greater than the content propagation appraisal value of the third user account;

searching for a minimum of quantities of user accounts between the third user account and the found user accounts on a social relationship chain;

calculating, according to a preset increasing function, a correction coefficient by using the minimum as an independent variable; and updating the content propagation appraisal value of the third user account according to the correction coefficient.

In another embodiment, that the processor 1002 calls the program code stored in the memory 1003 to perform the operation of selecting, according to the content propagation appraisal values, user accounts to push content data may further include:

traversing the user accounts and obtaining a click probability of a traversed fourth user account for the content data;

calculating a content propagation appraisal value of the fourth user account and a weighted sum of the click probability of the fourth user account for the content data; and selecting, according to the weighted sum, the user accounts to push the content data.

In another embodiment, that the processor 1002 calls the program code stored in the memory 1003 to perform the operation of selecting, according to the content propagation appraisal values, user accounts to push content data may further include:

obtaining a preset quantity of users for delivery; and the user accounts are sorted according to the content propagation appraisal values and the user accounts that correspond to a number of users for delivery and are top-ranked among the sorted user accounts are selected to push the content data.

Various embodiments of the present disclosure provide the following beneficial effects.

As disclosed, association and forwarding operations between user accounts in a social network application are utilized to push the content data only to a small quantity of user accounts. The content data is then transferred to other user accounts on social relationship chains on the small quantity of user accounts by sequentially forwarding the content data. The content data is thus spread by the small quantity of user accounts to a broader range of user accounts. Meanwhile, an association degree between users also ensures a probability for a user to click and/or view the content data that is forwarded by a user that this user follows, so as to improve delivery accuracy and a delivery scope of the content data.

Logics and/or steps represented in a flowchart or described in another manner can be regarded as, for example, a sequencing list of executable instructions for implementing logical functions, and can be specifically implemented in any computer readable medium, for an instruction execution system, apparatus, or device (such as a computer-based system, a system including a processor, or another system that can take and execute instructions from an instruction execution system, apparatus, or device) to use or use by combining these instruction execution systems, apparatuses, or devices. In the present specification, "a computer readable medium" may be any apparatus that may include, store, communicate with, propagate, or transmit programs for an instruction execution system, apparatus, or device to use or use by combining these instruction execution systems, apparatuses, or devices. A specific example (a non-greedy list) of the computer readable medium includes the following: an electric connection portion (an electronic apparatus) including one or more wirings, a portable computer enclosure (a magnetic apparatus), a random access memory (RAM), a read-only memory (ROM), an erasable programmable read-only memory (EPROM or flash memory), a fiber apparatus, and a portable optical disc read-only memory (CD-ROM). In addition, the computer readable medium may even print papers of the program or other media thereon because the program can be obtained in an electronic manner by, for example, performing optical scanning on papers or other media and then performing edition and interpretation or processing in another proper manner when necessary and then is stored in a computer memory.

It should be understood that parts of the present disclosure can be implemented by hardware, software, firmware, or a combination thereof. In the foregoing implementation manner, multiple steps or methods may be implemented by software or firmware that is stored in a memory and that is executed by a proper instruction system. For example, when hardware is used for implementation, same as in another implementation manner, implementation may be performed by any one of the following technologies well known in the art or a combination thereof: a discrete logic circuit including a logic gate circuit for implementing a logic function of a data signal, a dedicated integrated circuit including a proper combined logic gate circuit, a programmable gate array (PGA), a field programmable gate array (FPGA), and the like.

The storage medium mentioned above may be a read-only memory, a magnetic disk, or an optical disc. Although the embodiments of the present disclosure are shown and described above, it can be understood that the foregoing embodiments are illustrative and cannot be understood as limitations to the present disclosure. A person of ordinary skill in the art can change, modify, replace, and deform the foregoing embodiments within the scope of the present disclosure.

What is claimed is:

1. A content delivery method, comprising:
   providing an apparatus including a memory and a processor coupled to the memory;
   identifying, by the processor, user accounts;
   generating, by the processor, a first content propagation appraisal value of at least one of the user accounts;
   iteratively performing by the processor:
      searching for friend accounts of the at least one of the user accounts by traversing the user accounts;
      calculating a weighted sum of content propagation appraisal values of the friend accounts of the at least one of the user accounts; and
      assigning to the at least one of the user accounts a second content propagation appraisal value, the second content propagation appraisal value being a sum of the weighted sum and the first content propagation appraisal value;
   exiting iteration by the processor when a difference between the first and second content propagation appraisal values of the at least one of the user accounts is smaller than a preset value;
   repeating the generating, the iteratively performing, and the exiting on at least another of the user accounts;
   sorting the at least one and the at least another of the user accounts based on their respective second content propagation appraisal values to obtain at least one sorted user account;
   selecting by the processor, at least one target user account, from the at least one sorted user account, wherein the at least one target user account is thus selected such that a target user is relatively more likely to view and forward the content data via a target user terminal associated with the at least one target user account; and
   pushing, by the processor, the content data to the at least one target user account, wherein content-data-delivery efficiency is relatively improved via account-spreading from a selected few to a greater quantity of the user accounts.

2. The content delivery method according to claim 1, wherein the first content propagation appraisal value of the at least one of the user accounts is generated by includes:
   calculating a first forwarding probability of the at least one of the user accounts.

3. The content delivery method according to claim 1, wherein calculating the weighted sum of the content propagation appraisal values of the friend accounts of the at least one of the user accounts includes:
   traversing the friend accounts of the at least one of the user accounts;
   calculating a traversed forwarding probability of a traversed friend account of the at least one of the user accounts;

setting the traversed forwarding probability as a weight coefficient of a content propagation appraisal value of the traversed friend account of the at least one of the user accounts; and calculating the weighted sum of the content propagation appraisal values of the friend accounts of the at least one of the user accounts according to the weight coefficient of the content propagation appraisal value of the friend account of the at least one of the user accounts.

4. The content delivery method according to claim 3, wherein calculating the traversed forwarding probability of the traversed friend account for the at least one of the user accounts includes:

obtaining a quantity of releasing times for releasing content by the at least one of the user accounts;

obtaining a quantity of forwarding times for forwarding, by the traversed friend account, the content released by the at least one of the user accounts; and dividing the quantity of forwarding times by the quantity of releasing times to calculate the traversed forwarding probability of the traversed friend account of the at least one of the user accounts.

5. The content delivery method according to claim 1, wherein exiting iteration by the processor further includes:

obtaining a quantity of traversing times for traversing the at least one of the user accounts; and exiting iteration by the processor when the difference between the first and second content propagation appraisal values of the at least one of the user accounts is smaller than the preset value and also when the quantity of traversing times for traversing is greater than or equal to a threshold.

6. The content delivery method according to claim 1, wherein assigning to the at least one of the user accounts a second content propagation appraisal value further includes:

searching for a minimum of quantities of user accounts between the at least one of the user accounts and friend accounts of the at least one of the user accounts on a social relationship chain;

calculating, according to the minimum of quantities of user accounts, a correction coefficient; and assigning to the at least one of the user accounts an updated second content propagation appraisal value, wherein the updated second content propagation appraisal value is based on the second content propagation appraisal value and the correction coefficient.

7. The content delivery method according to claim 1, wherein selecting the at least one target user account includes:

obtaining a probability of data-clicking and/or data-converting for each of the at least one and at least another of the user accounts; and selecting by the processor, the at least one target user accounts from the at least one sorted user account in view of the probability of data-clicking and/or data-converting.

8. A content delivery apparatus, comprising: a memory and a processor coupled to the memory, the processor being configured to perform:

identifying user accounts;

generating a first content propagation appraisal value of at least one of the user accounts;

iteratively perform:

searching for friend accounts of the at least one of the user accounts by traversing the user accounts;

calculating a weighted sum of content propagation appraisal values of the friend accounts of the at least one of the user accounts; and assigning to the at least one of the user accounts a second content propagation appraisal value, the second content propagation appraisal value being a sum of the weighted sum and the first content propagation appraisal value;

exiting iteration when a difference between the first and second content propagation appraisal values of the at least one of the user accounts is smaller than a preset value;

repeating the generating, the iteratively performing, and the exiting on at least another of the user accounts;

sorting the at least one and the at least another of the user accounts based on their respective second content propagation appraisal values to obtain at least one sorted user account;

selecting at least one target user account from the at least one sorted user account, wherein the at least one target user account is thus selected such that a target user is relatively more likely to view and forward the content data via a target user terminal associated with the at least one target user account; and pushing the content data to the at least one target user account, wherein content-data-delivery efficiency is relatively improved via account-spreading from a selected few to a greater quantity of the user accounts.

9. The content delivery apparatus according to claim 8, wherein the first content propagation appraisal value of the at least one of the user accounts is generated by calculate a first forwarding probability of the at least one of the user accounts.

10. The content delivery apparatus according to claim 8, wherein the processor is further configured to perform:

traversing the friend accounts of the at least one of the user accounts;

calculating a traversed forwarding probability of a traversed friend account of the at least one of the user accounts;

setting the traversed forwarding probability as a weight coefficient of a content propagation appraisal value of the traversed friend account of the at least one of the user accounts; and calculating the weighted sum of the content propagation appraisal values of the friend accounts of the at least one of the user accounts according to the weight coefficient of the content propagation appraisal value of the friend account of the at least one of the user accounts.

11. The content delivery apparatus according to claim 10, wherein the processor is further configured to perform:

obtaining a quantity of releasing times for releasing content by the at least one of the user accounts;

obtaining a quantity of forwarding times for forwarding, by the traversed friend account, the content released by the at least one of the user accounts; and dividing the quantity of forwarding times by the quantity of releasing times to calculate the traversed forwarding probability of the traversed friend account of the at least one of the user accounts.

12. The content delivery apparatus according to claim 8, wherein the processor is further configured to:

obtaining a quantity of traversing times for traversing the at least one of the user accounts; and exiting iteration when the difference between the first and second content propagation appraisal values of the at least one of the user accounts is smaller than the preset value and also when the quantity of traversing times for traversing is greater than or equal to a threshold.

13. The content delivery apparatus according to claim 8, wherein assigning to the at least one of the user accounts a second content propagation appraisal value further includes:
   searching for a minimum of quantities of user accounts between the at least one of the user accounts and friend accounts of the at least one of the user accounts on a social relationship chain;
   calculate, according to the minimum of quantities of user accounts, a correction coefficient; and
   assigning to the at least one of the user accounts an updated second content propagation appraisal value, wherein the updated second content propagation appraisal value is based on the second content propagation appraisal value and the correction coefficient.

14. The content delivery apparatus according to claim 8, wherein selecting the at least one target user account includes:
   obtaining a probability of data-clicking and/or data-converting for each of the at least one and at least another of the user accounts; and
   selecting by the processor, the at least one target user accounts from the at least one sorted user account in view of the probability of data-clicking and/or data-converting.

15. A non-transitory computer-readable storage medium containing computer-executable program instructions for, when executed by a processor, performing a content delivery method, the method comprising:
   identifying, by the processor, user accounts;
   generating, by the processor, a first content propagation appraisal value of at least one of the user accounts;
   iteratively performing by the processor:
      searching for friend accounts of the at least one of the user accounts by traversing the user accounts;
      calculating a weighted sum of content propagation appraisal values of the friend accounts of the at least one of the user account; and
   assigning to the at least one of the user accounts a second content propagation appraisal value, the second content propagation appraisal value being a sum of the weighted sum and the first content propagation appraisal value;
   exiting iteration by the processor when a difference between the first and second content propagation appraisal values of the at least one of the user accounts is smaller than a preset value;
   repeating the generating, the iteratively performing, and the exiting on at least another of the user accounts;
   sorting the at least one and the at least another of the user accounts based on their respective second content propagation appraisal values to obtain at least one sorted user account;
   selecting by the processor, at least one target user account, from the at least one sorted user account, wherein the at least one target user account is thus selected such that a target user is relatively more likely to view and forward the content data via a target user terminal associated with the at least one target user account; and
   pushing, by the processor, the content data to the at least one target user account, wherein content-data-delivery efficiency is relatively improved via account-spreading from a selected few to a greater quantity of the user accounts.

16. The storage medium according to claim 15, wherein the first content propagation appraisal value of the at least one of the user accounts is generated by:
   calculating a first forwarding probability of the at least one of the user accounts.

17. The non-transitory computer-readable storage medium according to claim 15, wherein selecting the at least one target user account includes:
   obtaining a probability of data-clicking and/or data-converting for each of the at least one and at least another of the user accounts; and
   selecting by the processor, the at least one target user accounts from the at least one sorted user account in view of the probability of data-clicking and/or data-converting.

* * * * *